A. B. WILEY.
CAMPER'S COOKER.
APPLICATION FILED JULY 8, 1919.
1,396,613.
Patented Nov. 8, 1921.
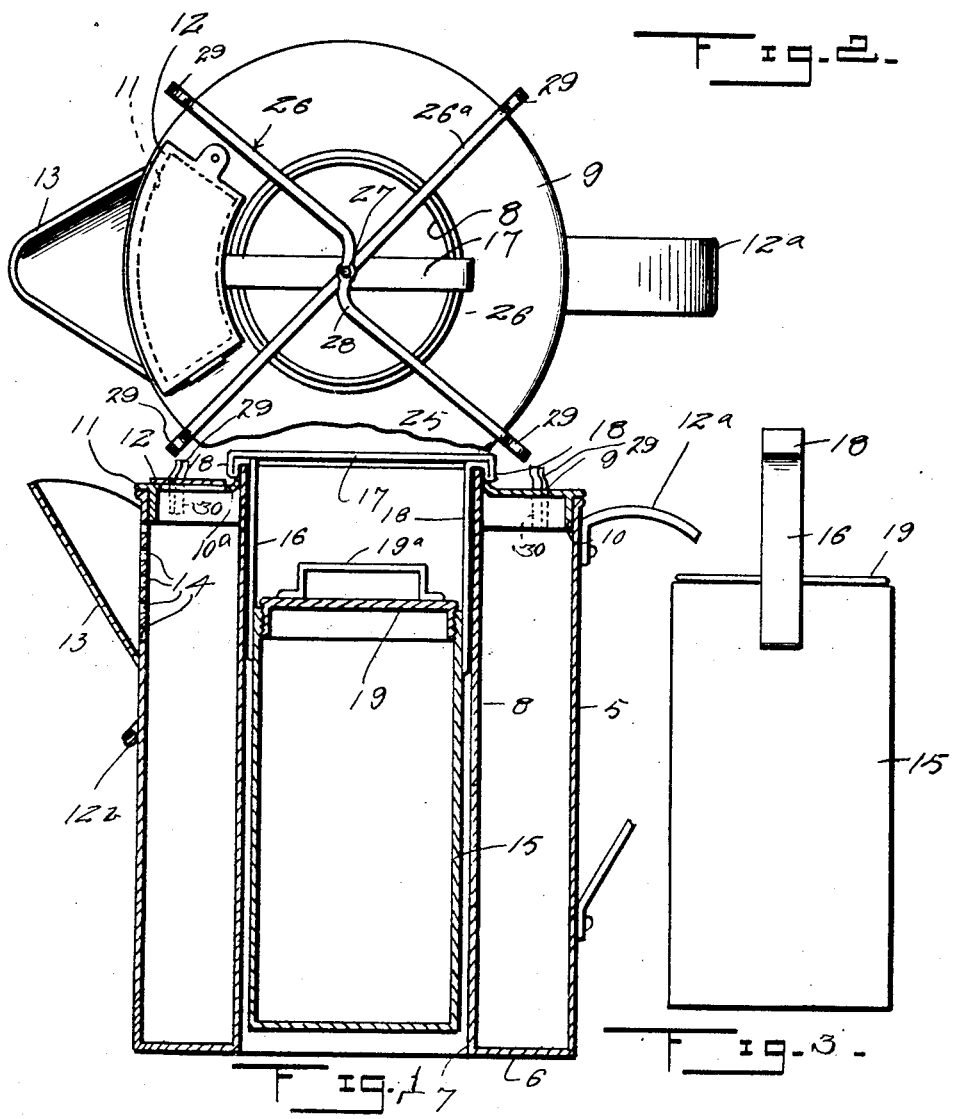

UNITED STATES PATENT OFFICE.

ARTHUR B. WILEY, OF SWEETWATER, OKLAHOMA.

CAMPER'S COOKER.

1,396,613.  Specification of Letters Patent.  Patented Nov. 8, 1921.

Application filed July 8, 1919. Serial No. 309,260.

*To all whom it may concern:*

Be it known that I, ARTHUR B. WILEY, a citizen of the United States, residing at Sweetwater, in the county of Roger Mills and State of Oklahoma, have invented certain new and useful Improvements in Campers' Cookers; and I do hereby declare the following to be a full, clear, and exact description of the invention, such as will enable others skilled in the art to which it appertains to make and use the same.

My invention relates to improvements in campers' cookers, and has for one of its objects to provide an inexpensive device capable of being knocked down and packed away in a conveniently small space.

A further object of this invention is to provide a campers' cooker so constructed as to permit it to be readily assembled in set up position and ready for use and capable of cooking a meal in a quick and reliable manner.

A further object of this invention is to provide a cooker including a novel supporting means whereby the heating source may be applied directly to the under side of the cooker so as to boil the contents.

Another object of this invention is to so construct a cooker and provide it with means for supporting a coal oil or fuel container when not in use.

A still further object of this invention is the provision of a campers' cooker of this character, which will be simple, practical and comparatively inexpensive in construction and one that can be manufactured and sold at a low cost.

With these and other objects in view, the invention consists in the novel combination and arrangement of parts hereinafter more fully described and set forth in the claim hereto appended.

The preferred embodiment of the invention is illustrated in the accompanying drawings, wherein:

Figure 1 is a sectional view taken on a plane extended vertically and centrally through a camper's cooker constructed in accordance with my invention, the fuel container being shown in position in the flue.

Fig. 2 is a top plan view of the cooker.

Fig. 3 is a detail side elevation of the fuel container removed.

Like numerals of reference designate corresponding parts in all the figures of the drawings.

Referring to the drawings in detail, 5 designates the receptacle of my improved cooker. The receptacle is preferably cylindrical, and has its lower wall 6 provided with an opening 7 surrounded by the lower end of the flue 8 which is secured to the wall 6. The flue 8 extends vertically through the receptable 5, and its upper end terminates at a point above the upper end of the side wall of the receptacle. A cover 9 for the upper open end of the receptacle 5, is removably secured in position by a flange 10. It is provided with an opening $10^a$ for the reception of the upper end of the flue 8 and with a filling opening 11. The opening 11 is closed by a pivoted lid 12. The receptacle 5 is provided with a handle $12^a$ and a bail $12^b$. It is also provided with a pouring spout 13 which communicates with the interior thereof through openings 14.

A fuel container 15 is adapted to be supported within the flue 8 when the cooker is not in use. To support the container within the flue, and to permit it to be readily and quickly inserted therein and removed therefrom, a handle 16 is secured to its upper end. The grip 17 of the handle is longer than the diameter of the flue 8, and is provided at its ends with downturned hooks 18 which are adapted to engage over the upper projecting end of the flue, as clearly illustrated in Fig. 1 of the drawings. The upper end of the fuel container 15 is closed by a removable cap 19. This cap has threaded engagement with the fuel container 15, and it is provided with a handle $19^a$ by means of which it may be readily and quickly applied and removed.

When the cooker is in use, the receptacle 5 is adapted to be supported above the ground by suitable means, not shown. The base preferably comprises a pair of U-shaped members 21.

A frame 26, which is removably secured to the upper end of the receptacle 5, is adapted to support a frying pan or other cooking utensil above the upper end of the flue 8. This frame comprises two members $26^a$ which are pivotally connected together as at 27. One of the members $26^a$ is offset as at 28 to permit the members to be folded one against the other when the frame is not in use. The lower ends of the arms of the members $26^a$ are offset to provide shoulders 29 adapted to rest upon the cover 9, and to provide clamps 30 which are adapted to engage the side of the receptacle with sufficient force to prevent the accidental displacement of the frame 26. The distance between the clamps 30 of each member 26ª is slightly less than the diameter of the receptacle 5. In view thereof, and as the members 26ª are made of resilient material, the clamps 30 may engage the receptacle 5 with sufficient force to retain the frame 26 thereon against accidental displacement.

When it is desired to use the cooker, the fuel receptacle 15 is first removed from the flue 8. The base may then be unfolded and applied to the receptacle 5. After the receptacle 5 has been filled, the cover 9 is applied, and then the frame 26 is applied to the upper end of the receptacle. If desired, the receptacle 5 may be filled through the opening 11 without removing the cover 9.

When desired, a frying pan or other utensil may be placed on the support 26, and the fuel receptacle 15 removed to permit the contents of the receptacle to be heated from a burner or the like beneath the flue 8.

From the foregoing description, taken in connection with the accompanying drawings, it will be seen that I provide a campers' cooker which may be readily and quickly erected for use and which may as readily and quickly be knocked down and the parts assembled in such a manner as to permit it to be conveniently carried. The flue 8 has a dual function, namely, that of permitting the heat generated by a burner at the bottom thereof to cook the contents of the receptacle 5 and to cook the contents of the utensil supported by the frame 26, and that of forming a receptacle for the fuel container 15 when the cooker is not in use.

While in the foregoing there has been shown and described the preferred embodiment of this invention, it is to be understood that such changes may be made in the combination and arrangement of parts as will fall within the spirit and scope of the appended claim.

What is claimed is:

In a cooker, a receptacle having a flue, a cover closing the space exterior to the flue, a container in the flue, and a handle for the container engaging the top of the flue to hold the container in suspension and projecting beyond the flue to engage the cover and retain it in place.

In testimony whereof I affix my signature in presence of two witnesses.

ARTHUR B. WILEY.

Witnesses:
 MAUDELL LATTA,
 A. J. MUNLEY.